(12) United States Patent
Kovacevic et al.

(10) Patent No.: US 10,181,798 B2
(45) Date of Patent: Jan. 15, 2019

(54) STEP-UP DC-DC POWER CONVERTER

(71) Applicant: Danmarks Tekniske Universitet, Kgs. Lyngby (DK)

(72) Inventors: Milovan Kovacevic, Kgs. Lyngby (DK); Mickey P. Madsen, Kgs. Lyngby (DK)

(73) Assignee: Danmarks Tekniske Universitet, Kgs. Lungby (DK)

( * ) Notice: Subject to any disclaimer, the term of this patent is extended or adjusted under 35 U.S.C. 154(b) by 8 days.

(21) Appl. No.: 15/103,276

(22) PCT Filed: Dec. 17, 2014

(86) PCT No.: PCT/EP2014/078116
§ 371 (c)(1),
(2) Date: Jun. 9, 2016

(87) PCT Pub. No.: WO2015/091590
PCT Pub. Date: Jun. 25, 2015

(65) Prior Publication Data
US 2016/0315545 A1   Oct. 27, 2016

(30) Foreign Application Priority Data

Dec. 18, 2013 (EP) ..................... 13198052

(51) Int. Cl.
*H02M 3/335* (2006.01)
*H02M 1/08* (2006.01)
(52) U.S. Cl.
CPC ......... *H02M 3/33553* (2013.01); *H02M 1/08* (2013.01); *H02M 3/33523* (2013.01); *Y02B 70/1433* (2013.01)
(58) Field of Classification Search
CPC ......... H02M 2001/0032; H02M 3/156; H02M 2001/0025; H02M 3/33507;
(Continued)

(56) References Cited

U.S. PATENT DOCUMENTS

| | | |
|---|---|---|
| 5,442,536 A | 8/1995 | Zimmermann |
| 2009/0001955 A1* | 1/2009 | Yoshida ................ H02M 3/158 323/282 |
| 2013/0147543 A1 | 6/2013 | Dai et al. |

FOREIGN PATENT DOCUMENTS

| | | |
|---|---|---|
| CN | 103078494 A | 5/2013 |
| EP | 2 573 899 A1 | 3/2013 |
| WO | WO 2013/150352 A1 | 10/2013 |

OTHER PUBLICATIONS

Pavlovsky, M. et al., "A ZVS, Quasi-ZCS converter with an improved power rating for 14/42V automotive application" PESC'03. 2003 IEEE 34th annual Power Electronics Specialists Conference, Conference proceedings, Acapulco, Mexico, Jun. 15-19, 2003 (Annual Power Electronics Specialists conference), Jun. 15, 2003, pp. 628-633, vol. 2.

(Continued)

*Primary Examiner* — Adolf Berhane
*Assistant Examiner* — Henry Lee, III
(74) *Attorney, Agent, or Firm* — Knobbe, Martens, Olson & Bear, LLP

(57) ABSTRACT

A step-up DC-DC power converter comprises a primary side circuit and a secondary side circuit coupled through a galvanic isolation barrier. The primary side circuit comprises a positive and a negative input terminal for receipt of an input voltage and an input capacitor coupled between the positive and negative input terminals and the secondary side circuit comprises an output capacitor chargeable to a converter output voltage between a first positive electrode and a second negative electrode. The galvanic isolation barrier comprises a first capacitor coupled in series with the positive input terminal of the primary side circuit and the first positive electrode of the output capacitor; and a second capacitor coupled in series with the negative input terminal (Continued)

of the primary side circuit and the second negative electrode of the output capacitor.

14 Claims, 8 Drawing Sheets

(58) Field of Classification Search
CPC ......... H02M 3/33523; H02M 3/33584; H02M 2001/007; H02M 3/1588; H02M 1/14; H02M 1/15; H02M 2001/0048; H02M 3/3378; H02M 2003/1566
See application file for complete search history.

(56) References Cited

OTHER PUBLICATIONS

Sebastian, J. et al; "Improving Dynamic Response of Power Factor Correctors by Using Series-Switching Post-Regulator" Applied Power Electronics Conference and Exposition, APEC '98, Conference proceedings, Thirteenth annual Anaheim, CA, Feb. 1998, pp. 441-446, vol. 1.

International Search Report for PCT/EP2014/078116 dated Oct. 1, 2015.

\* cited by examiner

A)

B)

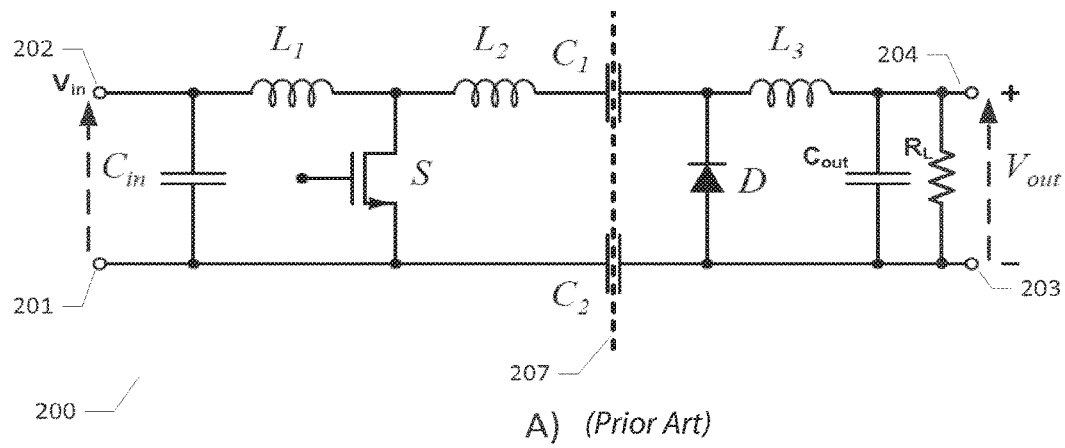
A) *(Prior Art)*
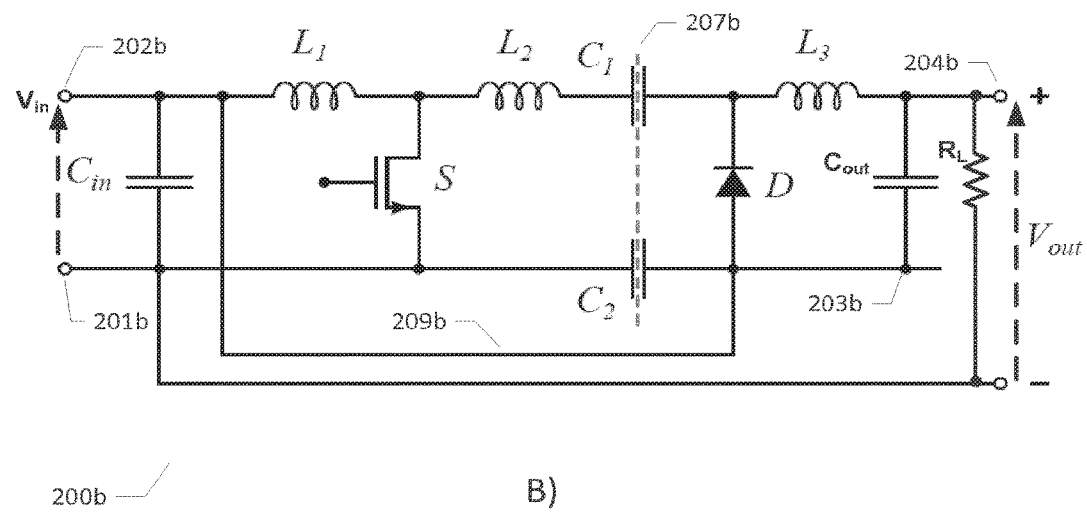
B)
FIGS. 2A, B

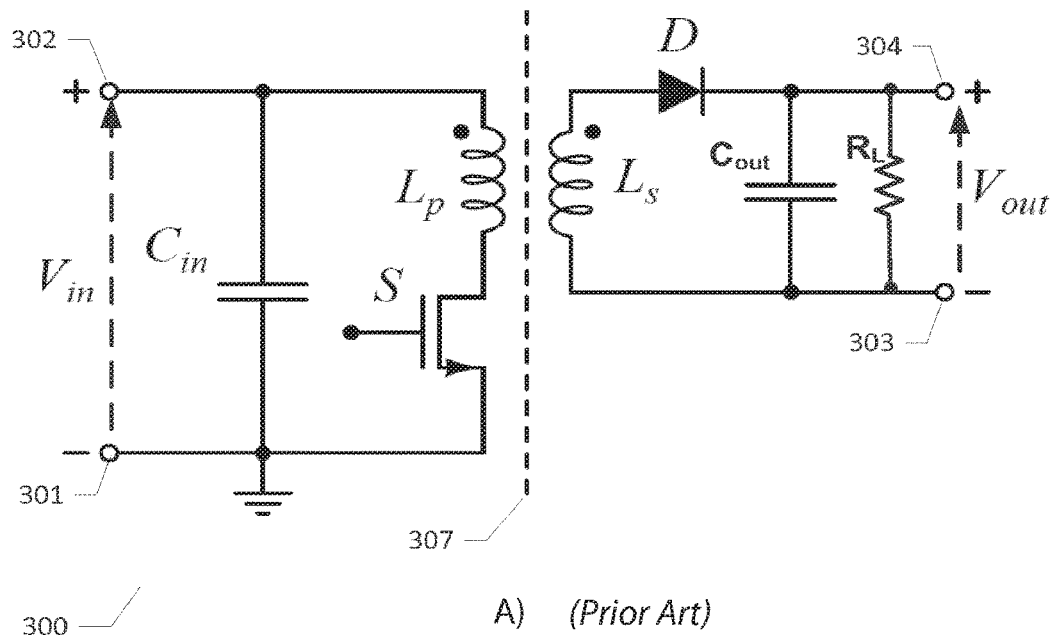
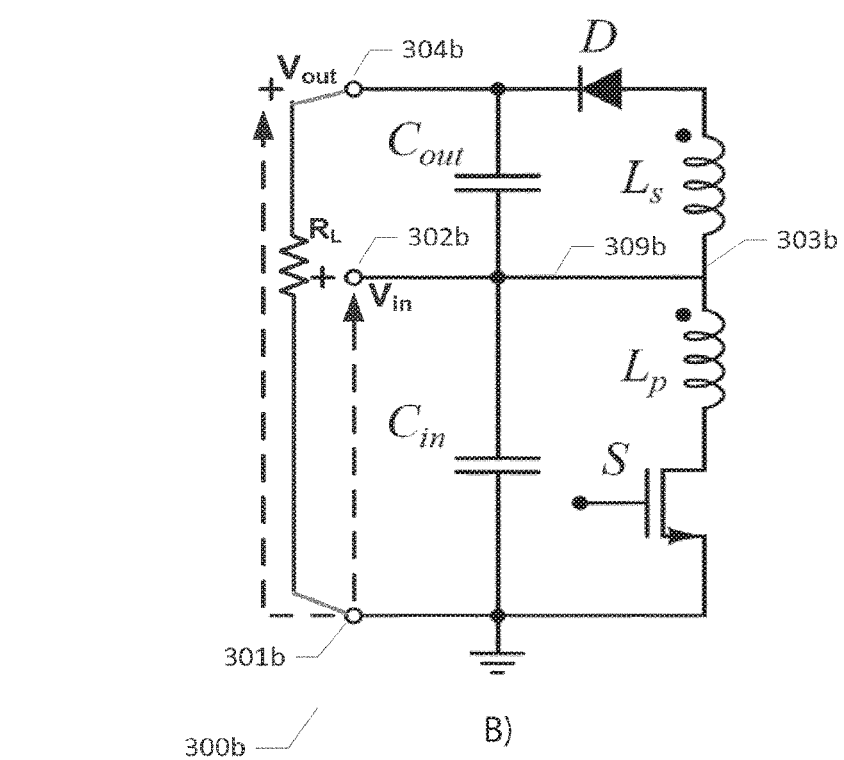
FIGS. 3A, B

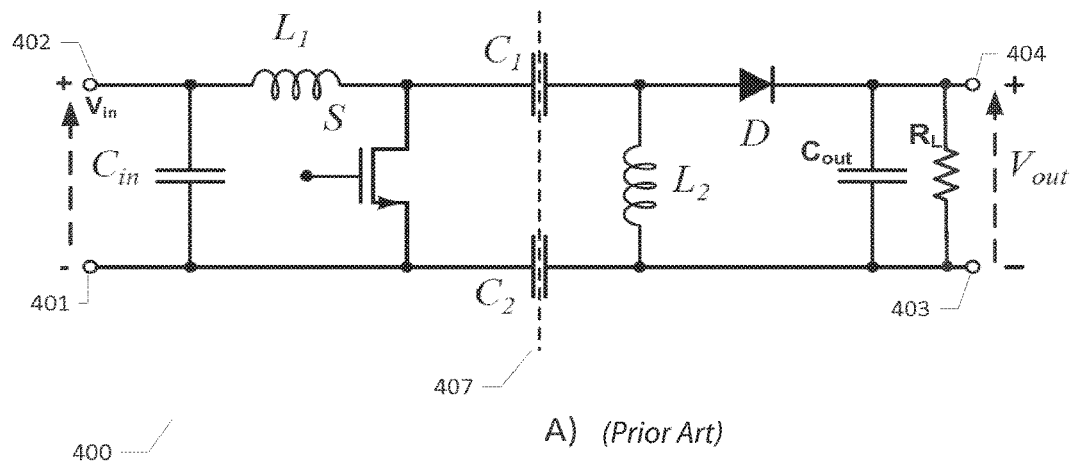
A) *(Prior Art)*
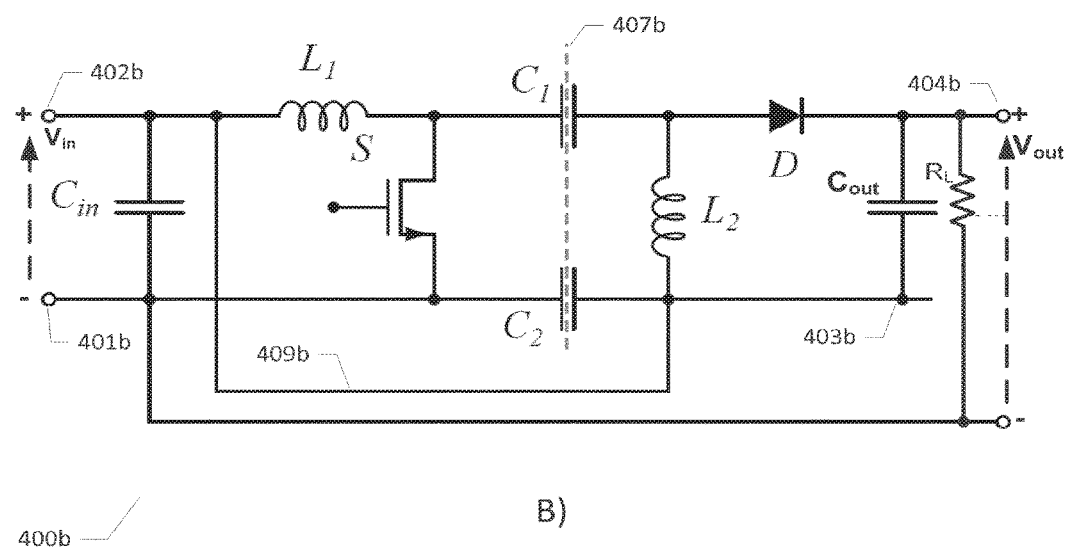
B)
FIGS. 4A, B

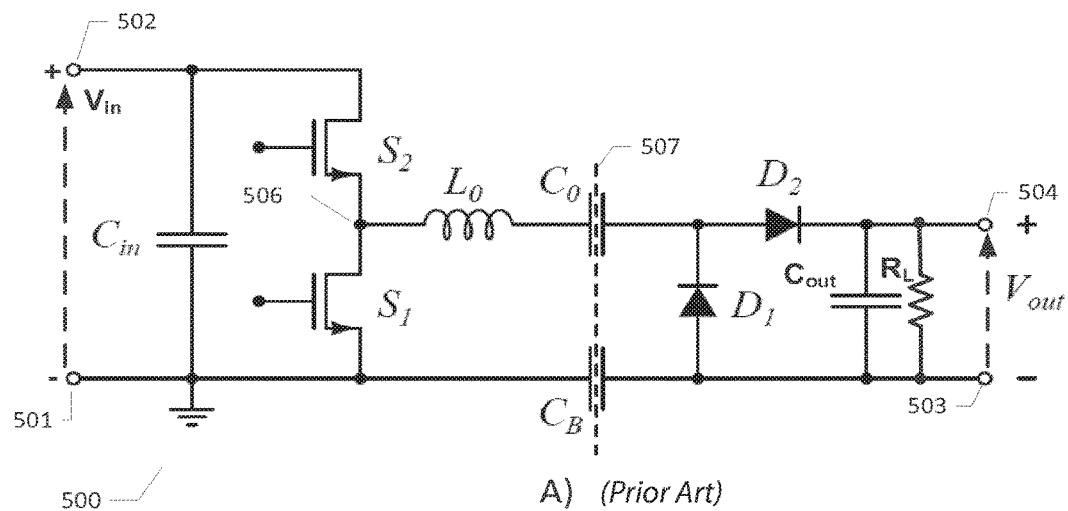
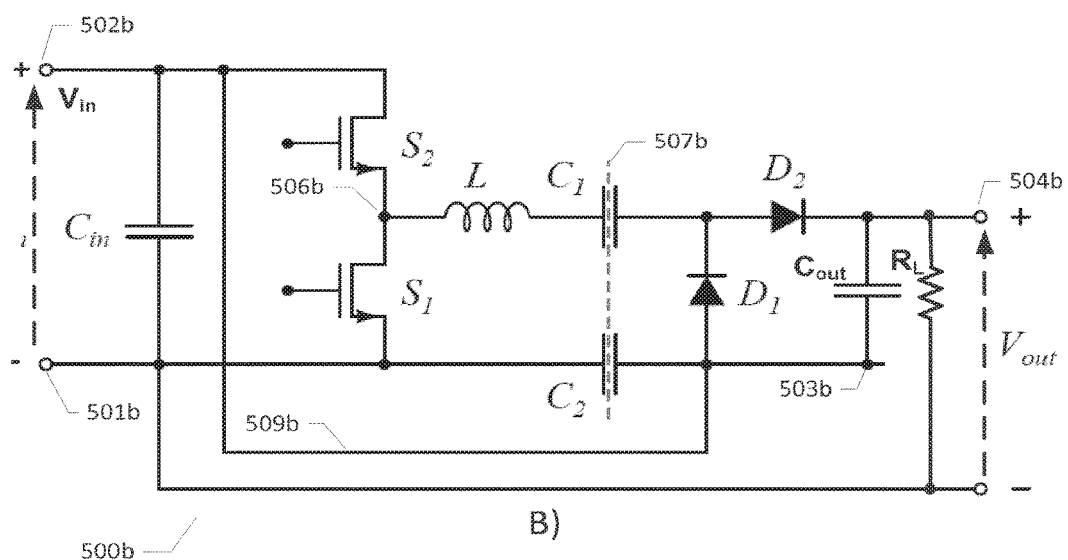
FIGS. 5A), B)

STEP-UP DC-DC POWER CONVERTER

CROSS REFERENCE TO RELATED APPLICATIONS

This application is a U.S. National Phase Application of PCT International Application Number PCT/EP2014/078116, filed on Dec. 17, 2014, designating the United States of America and published in the English language, which is an International Application of and claims the benefit of priority to European Patent Application No. 13198052.6, filed on Dec. 18, 2013. The disclosures of the above-referenced applications are hereby expressly incorporated by reference in their entireties.

The present invention relates to a step-up DC-DC power converter which comprises a primary side circuit and a secondary side circuit coupled through a galvanic isolation barrier. The primary side circuit comprises a positive and a negative input terminal for receipt of an input voltage and an input capacitor coupled between the positive and negative input terminals and the secondary side circuit comprises an output capacitor chargeable to a converter output voltage between a first positive electrode and a second negative electrode. A switched energy storage network is configured for alternatingly being charged from the input voltage and discharged to the output capacitor through the galvanic isolation barrier in accordance with a switch control signal to produce the converter output voltage. The step-up DC-DC power converter comprises an electrical short-circuit connection across the galvanic isolation barrier connecting, in a first case, the second negative electrode of the output capacitor to the positive input terminal of the primary side circuit or, in a second case, connecting the second positive electrode of the output capacitor to the negative input terminal of the primary side circuit thereby establishing in both the first and second cases a series coupling of the output capacitor and the input capacitor. A load connection is established, in the first case, between the first positive electrode of the output capacitor and the negative input terminal or, in the second case, between the second negative electrode of the output capacitor and the positive input terminal.

BACKGROUND OF THE INVENTION

Power density and component costs are key performance metrics of both isolated and non-isolated DC-DC power converters to provide the smallest possible physical size and/or lowest costs for a given output power requirement or specification. Resonant power converters are particularly useful for high switching frequencies such as frequencies above 1 MHz where switching losses of standard SMPS topologies (Buck, Boost etc.) tend to be unacceptable for conversion efficiency reasons. High switching frequencies are generally desirable because of the resulting decrease of the electrical and physical size of circuit components of the power converter like inductors and capacitors. The smaller components allow increase of the power density of the DC-DC power converter. In a resonant power converter an input "chopper" semiconductor switch (often MOSFET or IGBT) of the standard SMPS is re-placed with a "resonant" semiconductor switch. The resonant semiconductor switch relies on resonances of circuit capacitances and inductances to shape the waveform of either the current or the voltage across the semiconductor switch such that, when state switching takes place, there is no current through or no voltage across the semiconductor switch. Hence power dissipation is largely eliminated in at least some of the intrinsic capacitances or inductances of the input semiconductor switch such that a dramatic increase of the switching frequency becomes feasible for example to values above 10 MHz. This concept is known in the art under designations like zero voltage and/or zero current switching (ZVS and/or ZCS) operation. Commonly used switched mode power converters operating under ZVS and/or ZCS are often described as class E, class F or class DE inverters or power converters.

In view of the above, it remains a challenge to reduce the size and lower the component costs of both isolated and non-isolated DC-DC power converters. Hence, novel step-up DC-DC power converter topologies which reduce the required maximum voltage rating of active and passive components of the DC-DC converter are highly desirable. Likewise, novel step-up DC-DC power converter topologies which reduce the physical size or cost of active and passive components for example inductors, capacitors, transistors and diodes are highly desirable.

SUMMARY OF THE INVENTION

A first aspect of the invention relates to a step-up DC-DC power converter which comprises a primary side circuit and a secondary side circuit coupled through a galvanic isolation barrier. The primary side circuit comprises a positive and a negative input terminal for receipt of an input voltage and an input capacitor coupled between the positive and negative input terminals and the secondary side circuit comprises an output capacitor chargeable to a converter output voltage between a first positive electrode and a second negative electrode. A switched energy storage network is configured for alternatingly being charged from the input voltage and discharged to the output capacitor through the galvanic isolation barrier in accordance with a switch control signal to produce the converter output voltage. The step-up DC-DC power converter comprises an electrical short-circuit connection across the galvanic isolation barrier connecting, in a first case, the second negative electrode of the output capacitor to the positive input terminal of the primary side circuit or, in a second case, connecting the second positive electrode of the output capacitor to the negative input terminal of the primary side circuit thereby establishing in both the first and second cases a series coupling of the output capacitor and the input capacitor. A load connection is established, in the first case, between the first positive electrode of the output capacitor and the negative input terminal or, in the second case, between the second negative electrode of the output capacitor and the positive input terminal.

The present invention is described in detail in the following with reference to specific implementations in isolated resonant DC-DC power converters of Class E, DE and SEPIC topologies and a non-resonant flyback DC-DC converter topology. The skilled person will understand that the invention is equally applicable to other types of isolated resonant and non-resonant DC-DC power converter such as class $\pi_2$ inverters and rectifiers and resonant boost, buck, LCC converters etc.

The skilled person will understand that the electrical short-circuit connection across the galvanic isolation barrier eliminates the galvanic isolation between the primary and secondary side circuits of the step-up DC-DC converter by interconnecting the second electrode of the output capacitor and the negative input terminal. However, the electrical short-circuit connection provides numerous new benefits to the DC-DC converter as a whole and the lack of galvanic isolation is acceptable in numerous applications where the converter circuit is isolated from users such as retrofit LED bulbs and tubes. The series connection of the output and input capacitors established by the electrical short-circuit connection has the effect that the secondary side circuit only needs to supply the output voltage minus the input voltage of the present step-up DC-DC converter, instead of the entire converter output voltage as in ordinary isolated DC-DC power converters, to a converter load. The converter load is coupled between either the first positive electrode of the output capacitor and the negative input terminal or between the second negative electrode of the output capacitor and the positive input terminal depending on the connection points of the electrical short-circuit connection as explained in further detail below with reference to FIGS. 1A), 1B) and 1C). Consequently, since, the switched energy storage network only supplies a fraction of the converter output voltage it also supplies only a corresponding fraction of the total power to the converter load. The reduced voltage in the secondary side circuit of the step-up DC-DC power converter reduces the required maximum voltage rating of active and passive components therein such as semiconductor switch or switches, inductor(s), capacitors, diode(s) etc. The reduced maximum voltage rating of the active and passive components leads to physically smaller and/or less costly active and passive components. In addition, the life span of the latter components may increase by the smaller voltage stress. Likewise, in the primary side circuit the smaller amount of power to be transferred through the step-up DC-DC converter for a given amount of output power delivered to the converter load leads to reduced power requirements for active semiconductors switches allowing less costly and physically smaller semiconductors to be applied.

The beneficial reduction of the amount of power to be transferred through the switched energy storage network is achieved because the residual fraction of the output power is transferred directly from the input voltage source and input capacitor to the output capacitor due to their series connection as explained in further detail below with reference to FIGS. 1A), 1B) and 1C).

The skilled person will appreciate that the switched energy storage network can comprise numerous types of ordinary switch topologies such as a single switch topology, a half-bridge switch topology or full-bridge switch topologies. The switched energy storage network preferably comprises at least one semiconductor switch such as a MOSFET or IGBT such as a Gallium Nitride (GaN) or Silicon Carbide (SiC) transistor. A control terminal, e.g. a gate or base, of the at least one semiconductor switch may be coupled to, and driven by, the switch control signal to alternatingly force the least one semiconductor switch between on-states and off-states. In the on-state an inductor of the switched energy storage network may be charged with energy from the input voltage source and in the following off-state release stored energy to the output capacitor to charge the latter. The secondary side circuit of the step-up DC-DC converter may comprise a rectifying element such as a diode or transistor inserted in front of the converter load.

The galvanic isolation barrier may comprise a transformer which comprises a pair of magnetically coupled inductors comprising a first inductor electrically connected to the primary side circuit and a second inductor electrically connected to the secondary side circuit. The first and second inductors could be discrete windings both wound around a common magnetic permeable structure to form an isolation transformer. In an alternative embodiment, the first and second inductors are integrated in a printed circuit board without intervening magnetic material. The printed circuit board could have the entire step-up DC-DC power converter mounted thereon.

In yet another embodiment, the galvanic isolation barrier comprises a first capacitor coupled in series with the positive input terminal of the primary side circuit and the first positive electrode of the output capacitor and a second capacitor coupled in series with the negative input terminal of the primary side circuit and the second negative electrode of the output capacitor. Each of the first and second capacitors may possess particularly small physically dimensions in step-up resonant DC-DC power converters with a switching frequency, or frequency of the switch control signal, at or above 10 MHz. In the latter embodiments each of the first and second capacitors may comprise a ceramic capacitor and may possess a capacitance smaller than 10 nF such as smaller than 1 nF such as smaller than 100 pF. Isolation capacitors with these capacitances may be SMD mounted ceramic capacitors with a very small footprint as discussed below.

The skilled person will appreciate that a practical electrical short circuit connection will possess a finite DC resistance and an upper limit of this finite DC resistance will vary depending on input/output voltage and/or current requirements of the step-up DC-DC power converter. The electrical short-circuit connection may possess a DC resistance of less than 1 kΩ, even more preferably less than 100Ω, such as less than 10Ω. In other embodiments, the electrical short circuit connection may have a unidirectional resistance such that the DC resistance only falls below the above-mentioned upper limits in one direction and exhibits a much larger DC resistance in the opposite direction, i.e. a diode characteristic One embodiment of the step-up DC-DC power converter is based on a Class E converter and the switched energy storage network comprises first and second series connected inductors which are connected in series with the positive input terminal. A semiconductor switch is arranged with a first switch node connected between a mid-point node between the first and second series connected inductors and a second switch node connected to the negative input terminal of the primary side circuit. A control terminal of the semiconductor switch is connected to the switch control terminal; and a third inductor has a first end connected to a second end of the second inductor through the first capacitor of a galvanic isolation barrier and a second node connected to the converter output voltage at the positive electrode of the output capacitor. A rectifier is connected between the first end of the third inductor and the negative electrode of the output capacitor.

Another embodiment of the step-up DC-DC power converter is based on a flyback converter topology wherein the first and second inductors of the isolation transformer are integrated in the switched energy storage network. The first inductor is arranged with a first inductor end connected to the positive input voltage terminal and a second inductor end connected to a first node of a semiconductor switch such as a drain terminal of a MOSFET switch. A second node of the semiconductor switch is connected to the negative input terminal of the primary side circuit. The second inductor of the isolation comprising a first inductor end connected to the first positive electrode of output capacitor and a second inductor end connected to the second negative electrode, respectively, of the output capacitor through a rectifier.

The step-up DC-DC power converter may comprise a resonant DC-DC power converter to facilitate zero voltage and/or zero current switching of the semiconductor switch or switches of the switched energy storage network as discussed in additional detail below. The resonant DC-DC power converter is particularly advantageous at high switching frequencies of the switch control signal such as above 10 MHz or above 20 MHz such as at or above 30 MHz as discussed below.

The step-up DC-DC power converter may comprise a mode selecting semiconductor switch which is configured to switch the step-up DC-DC power converter between two distinct modes of operation. According to this embodiment, the step-up DC-DC power converter comprises a rectifying element, such as a diode, coupled between the positive input terminal and second negative electrode of the output capacitor. The mode selecting semiconductor switch which is configured to selectively break and close the electrical short-circuit connection such that:

in a first mode of the step-up DC-DC power converter, establishing the series connection of the output capacitor and the input capacitor; and in a second mode of the step-up DC-DC power converter, break the series coupling of the output capacitor and the input capacitor.

The mode selecting semiconductor switch may be switched between a conducting state and non-conducting state by a suitable control voltage applied on a control terminal of the mode selecting semiconductor switch such as a gate terminal of a MOSFET or FET semiconductor switch or base terminal of a BJT or IGBT semiconductor switch. A mode controlling circuit connected to, or integrated with, the step-up DC-DC power converter may be configured to supply this control voltage to the mode selecting semiconductor switch. The first mode of the step-up DC-DC power converter is selected in the conducting or ON state of the mode selecting semiconductor switch and the second mode of the step-up DC-DC power converter is selected in the non-conducting or OFF state of the mode selecting semiconductor switch. The rectifying element may comprise an ordinary diode or an active diode for example a semiconductor switch configured for diode operation by a suitable control signal applied to a control terminal of the semiconductor switch, The mode switching feature of this embodiment of the step-up DC-DC power converter provides several advantages such as increasing the dynamic voltage operating range of the converter as discussed in additional detail below with reference to the appended drawings.

In a range of particularly advantageous embodiments of the present step-up DC-DC power converters the switch control signal of the switched energy storage network is placed in the so-called VHF range with a switching frequency at or above 10 MHz, or more preferably at or above 20 MHz such as at or above 30 MHz. These step-up DC-DC power converters preferably comprises resonant topologies as mentioned above to facilitate zero voltage and/or zero current switching of the semiconductor switch or switches of the switched energy storage network. The VHF operation of these step-up DC-DC power converters provides considerable decrease of the electrical and physical size of active and passive components such as the previously discussed inductors and capacitors. Hence the previously mentioned transformer or capacitors of the galvanic isolation barrier of the present step-up DC-DC power converter can be physically small and inexpensive. The capacitor based galvanic isolation becomes particularly advantageous in the VHF frequency range as the capacitance of each of the isolation capacitors can be small, such as 10 nF or even smaller in some cases for example smaller than 1 nF such as about 100 pF. Isolation capacitors with these capacitances may comprise SMD mounted ceramic capacitors with a very small footprint e.g. a footprint less than 1 cm$^2$ for example a footprint down to about 4 mm$^2$. In VHF frequency range operating embodiments of the step-up DC-DC power converter, such resonant step-up DC-DC power converters, each of the input capacitor and the output capacitor may have a capacitance smaller than 100 nF. The skilled person will understand that the input and output capacitors in certain embodiments of the invention may be formed exclusively by a parasitic capacitance associated with the primary side circuit and the secondary side circuit, respectively.

The skilled person will furthermore understand that each of the present step-up DC-DC power converters may be constructed by conversion of an isolated DC-DC power converter with a corresponding topology as described in additional detail below with reference to FIGS. 2A)-2B) FIGS. 3A)-3B), FIGS. 4A)-4B) and FIGS. 5A)-5B). Hence, a second aspect of the invention relates to a method of converting an isolated DC-DC power converter to a step-up DC-DC power converter with higher power conversion efficiency, said method comprising steps of:

providing a primary side circuit and a secondary side circuit of the isolated DC-DC power converter, coupling an input capacitor between a positive and a negative input terminal of the primary side circuit, coupling an output capacitor between a positive and a negative terminal of the secondary side circuit, providing electrical coupling of the primary side circuit and the secondary side circuit through a galvanic isolation barrier, providing a switched energy storage network configured for alternatingly being charged from an input voltage of the converter and discharged to the output capacitor through the galvanic isolation barrier in accordance with a switch control signal to produce a converter output voltage, connecting, in a first case, an electrical short-circuit across the galvanic isolation barrier from the negative output terminal of the secondary side circuit to the positive input terminal of the primary side circuit or connecting, in a second case, the positive output terminal of the secondary side circuit to the negative input terminal of the primary side circuit thereby establishing in both the first case and the second case a series coupling of the output capacitor and the input capacitor, coupling, in a first case, a power converter load between the positive terminal of the secondary side circuit and the negative input terminal or coupling, in the second case, the power converter load between the negative terminal of the secondary side circuit and the positive input terminal of the primary side circuit.

A preferred embodiment of the above conversion methodology generates the previously discussed step-up DC-DC power converter with the mode switching feature.

This is achieved by adding further method steps of:

connecting a rectifying element, such as a diode, between the positive input terminal and second negative electrode of the output capacitor; and inserting a mode selecting semiconductor switch into the electrical short-circuit connection for selectively breaking and closing/making the short circuit connection such that:

establishing the series connection of the output capacitor and the input capacitor in a first mode of the step-up DC-DC power converter; and breaking or disconnecting the series coupling of the output capacitor and the input capacitor in a second mode of the step-up DC-DC power converter.

The higher power conversion efficiency of the present step-up DC-DC power converter embodiments is achieved because a considerable amount of the power delivered to the converter load may be transferred directly from the input voltage source and input capacitor of the input side circuit to the output capacitor of the output side circuit due to the series connection of the input and output capacitors provided by the electrical short circuit connection as explained above. Hence, a smaller amount of power has to be transferred through the switched energy storage network and isolation barrier leading to lower power losses in the active and/or passive components thereof. The isolated DC-DC power converter may comprise a resonant DC-DC power converter, preferably a resonant DC-DC power converter where the frequency of the switch control signal of the switched energy storage network has a frequency at or above 10 MHz such as at or above 20 MHz, more preferably at or above 30 MHz.

BRIEF DESCRIPTION OF THE DRAWINGS

Preferred embodiments of the invention will be described in more detail in connection with the appended drawings, in which:

FIG. 5B) is an electrical circuit diagram of a class DE resonant step-up DC-DC power converter in accordance with a 9$^{th}$ embodiment of the invention.

DETAILED DESCRIPTION OF PREFERRED EMBODIMENTS

Figure 1A:
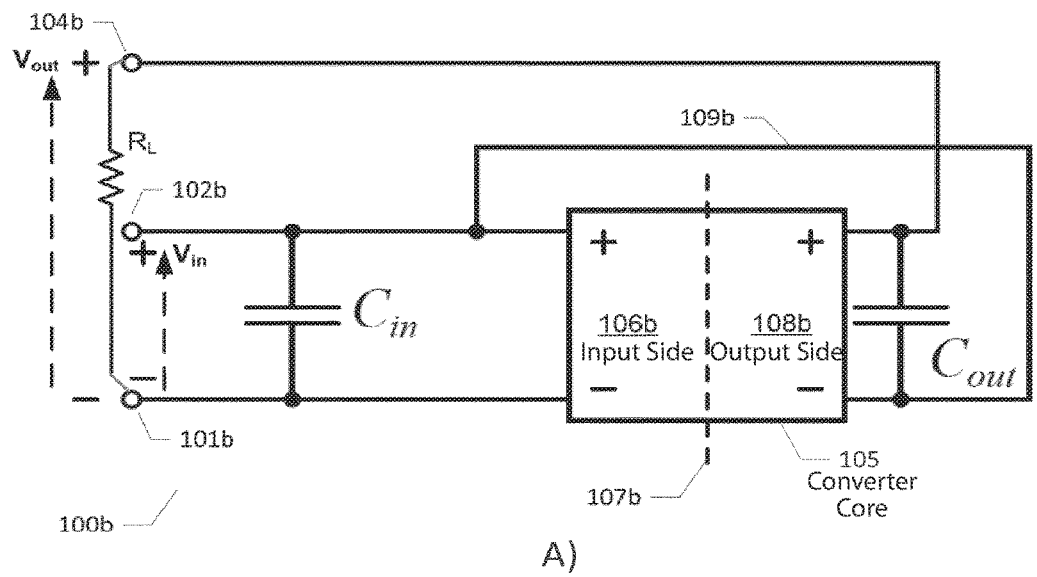
FIGS. 1A) and 1B) are simplified electrical circuit diagrams illustrating a step-up DC-DC power converter in accordance with a first embodiment of the present invention, FIG. 1C) is a simplified electrical circuit diagram of a step-up DC-DC power converter in accordance a second embodiment of the invention, FIG. 1D) is a simplified electrical circuit diagram of a step-up DC-DC power converter in accordance a third embodiment of the invention, FIG. 1E) is simplified electrical circuit diagram of a step-up DC-DC power converter in accordance a fourth embodiment of the invention, FIG. 1F) is simplified electrical circuit diagram of a step-up DC-DC power converter in accordance a fifth embodiment of the invention, FIG. 2A) is an electrical circuit diagram of a prior art isolated class E resonant DC-DC converter comprising a series resonant circuit, FIG. 2B) is an electrical circuit diagram of a class E resonant step-up DC-DC power converter comprising a series resonant circuit in accordance with a sixth embodiment of the invention, FIG. 3A) is an electrical circuit diagram of a prior art flyback DC-DC converter, FIG. 3B) is an electrical circuit diagram of a flyback step-up DC-DC power converter in accordance with a 7$^{th}$ embodiment of the invention, FIG. 4A) is an electrical circuit diagram of a prior art isolated SEPIC converter, FIG. 4B) is an electrical circuit diagram of a step-up SEPIC DC-DC converter in accordance with an 8$^{th}$ embodiment of the invention, FIG. 5A) is an electrical circuit diagram of a prior art isolated class DE resonant DC-DC converter comprising a series resonant circuit.
Figure 1A:
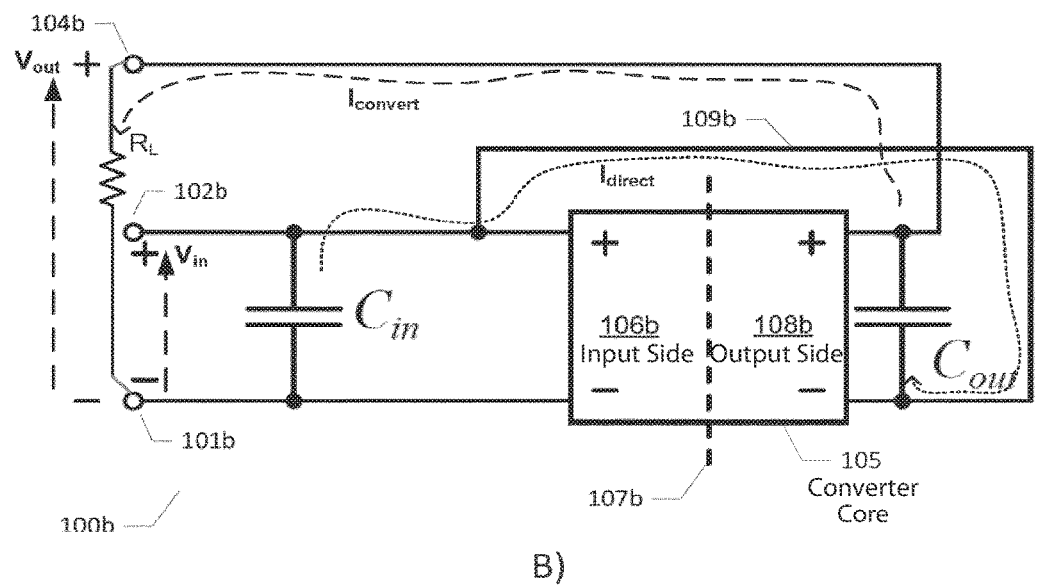

FIGS. 1A) and 1B) are simplified electrical circuit diagrams 100b illustrating basic operational principles of step-up DC-DC power converters in accordance with a first embodiment of the present invention. Two different variants of a generic converter circuit topology are illustrated on FIGS. 1A, 1B) and FIG. 1C), respectively. FIG. 1A) shows a step-up DC-DC power converter 100b comprising a primary side circuit and a secondary side circuit connected through a galvanic isolation barrier 107b. The primary side circuit comprises a positive input terminal 102b and a negative input terminal 101b for receipt of a DC or AC input voltage $V_{in}$ from a voltage or power source (not shown). An input capacitor $C_{in}$ is electrically connected between the positive input terminal 102b and a negative input terminal 101b to form an energy reservoir for the voltage source. The primary side circuit additionally comprises an input side 106b of a switched energy storage network of a converter core 105 arranged in front of the isolation barrier 107b. The secondary side circuit comprises an output capacitor $C_{out}$ having a first electrode electrically connected to the converter output voltage $V_{out}$ at output terminal 104b. A second electrode of the output capacitor $C_{out}$, situated at a lower voltage potential than the first electrode, is connected to the positive input terminal 102b on the input side circuit via an electrical short-circuit connection or wire 109b extending across the isolation barrier 107b. The electrical short-circuit connection or wire 109b effectively places the output capacitor $C_{out}$ and input capacitor $C_{in}$ is series or cascade between the output voltage $V_{out}$ at output terminal 104b and the negative input terminal 101b. An electrical load $R_{load}$ of the step-up DC-DC converter 100b is coupled between the output terminal 104b and the negative input terminal 101b such that in effect the output and input capacitors $C_{out}$, $C_{in}$ are coupled series to supply power or current to the electrical load. The primary side circuit comprises the previously discussed input side 106b of the switched energy storage network of the step-up DC-DC converter 100b and the secondary side circuit comprises an output side 108b of the switched energy storage network of the converter core 105. The skilled person will appreciate that the switched energy storage network may include numerous circuit topologies depending on the particular type of DC-DC converter in question. The switched energy storage network preferably comprises at least one inductor for energy storage and release, but may alternatively exclusively comprise capacitors for energy storage Generally, the switched energy storage network is configured for alternatingly being charged from the input voltage $V_{in}$ and discharged to the output capacitor $C_{out}$ through the isolation barrier 107b in accordance with a switch control signal to produce the converter output voltage $V_{out}$. The primary side circuit preferably comprises at least one semiconductor switch, for example a MOSFET, which is switched between on-states and off-states by the switch control signal such that the input voltage is modulated in accordance with a switch control signal. The frequency of the switch control signal of the switched energy storage network may be at or above 30 MI-Hz to form a so-called VHF type of DC-DC power converter. The switch control signal may comprise a PWM modulated control signal. The primary side circuit may comprise an inductor that is charged with energy during an on-state of the least one semiconductor switch from the input capacitor $C_{in}$ and/or the DC or AC input voltage $V_{in}$. The inductor of the primary side circuit may subsequently be discharged through the output side 108b of the switched energy storage network and the output capacitor $C_{out}$ in an off-state of the least one semiconductor switch. The secondary side circuit may comprise a diode based rectifier or a synchronous rectifier in front of the output capacitor to produce the converter output voltage $V_{out}$ as a DC output voltage.

While the electrical short-circuit connection or wire 109b eliminates the galvanic isolation between the input and output side circuits of the step-up DC-DC converter 100b by interconnecting the second electrode of the output capacitor $C_{out}$ and the negative input terminal 101b, it provides numerous new benefits to the DC-DC converter as a whole as illustrated with reference to FIG. 1B). The series connection of the output and input capacitors $C_{out}$, $C_{in}$ means that the secondary side circuit only needs to supply the converter output voltage minus the input voltage (i.e. $V_{out}$ minus $V_{in}$) to the electrical load $R_{load}$ instead of the entire output voltage which is the situation in prior art isolated DC-DC converter topologies. Since, the switched energy storage network, including the input and output sides 106b, 108b, only supplies a fraction of the converter output voltage $V_{out}$ it also supplies a corresponding fraction of the total power only to the electrical load $R_{load}$. The reduced voltage across the output section 108b reduces the required maximum voltage rating of active and passive components therein leading to physically smaller and/or less costly active and passive components for example inductors, capacitors (including $C_{out}$), transistors and diodes etc. In addition, the life span of the latter components may increase by the smaller voltage stress. In the input section 106b, the smaller amount of power to be transferred through the DC-DC converter 100b for supplying a given converter output power to the electrical load, leads to reduced power requirements for active semiconductors switches allowing less costly and physically smaller semiconductors to be applied.

These beneficial reductions of the amount of power to be transferred through the switched energy storage network 106b, 107b, 108b are achieved because the residual fraction of the output power supplied to the electrical load is transferred directly from the input voltage source $V_{in}$ and input capacitor $C_{in}$ to the output capacitor $C_{out}$. This power transfer mechanism is illustrated by the first output current path $I_{convert}$ which shows how secondary side current charges the output capacitor $C_{out}$ when the current is drawn by the load and thereby delivers power that has passed through the switched energy storage network in a conventional manner. However, the present DC-DC converter also comprises a second output current path $I_{direct}$ which illustrates how the output capacitor $C_{out}$ is charged directly from the input voltage source $V_{in}$ and input capacitor $C_{in}$ when the current is drawn by the load without passing through input and output sides 106b, 108b and isolation barrier 107b of the switched energy storage network. The skilled person will appreciate that a practical electrical short circuit connection 109b will possess a certain DC resistance and an upper limit for this DC resistance will vary depending on input/output voltage and/or current requirements of the converter 100b. The electrical short-circuit connection may possess a DC resistance of less than 1 kΩ, even more preferably less than 100Ω, such as less than 10Ω. In other embodiments, the electrical short circuit connection 109b may have a unidirectional resistance such that the DC resistance only falls below the above-mentioned upper limits in one direction and exhibits a much larger DC resistance in the opposite direction, i.e. a diode characteristic.

Figure 1C:
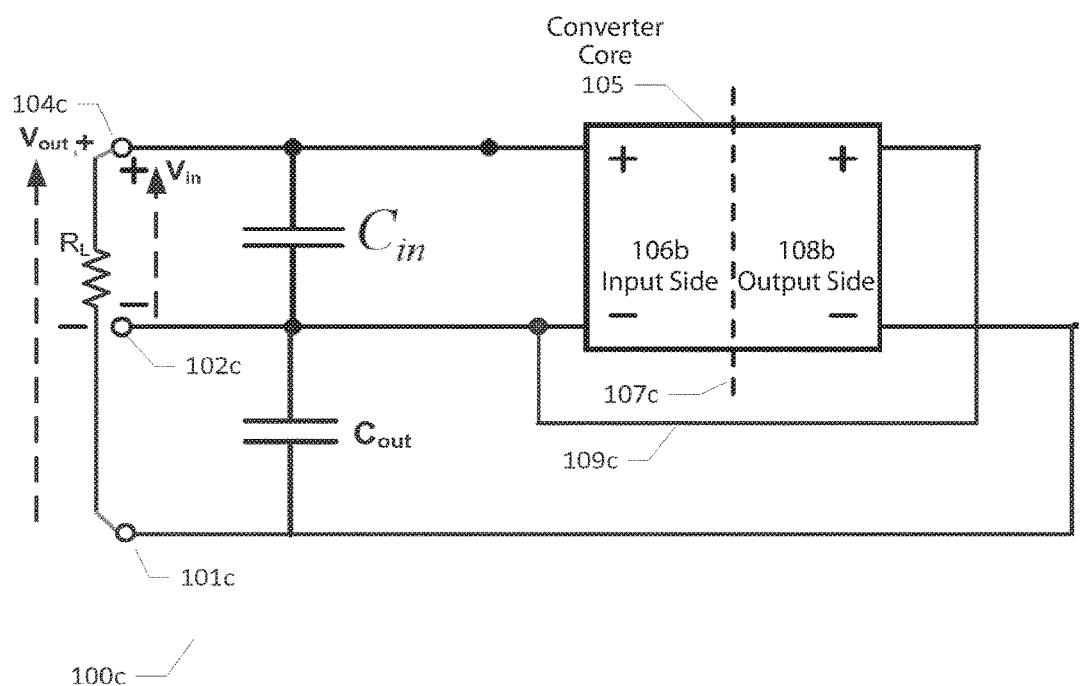

FIG. 1C) is a simplified electrical circuit diagram 100c illustrating basic operational principles of step-up DC-DC power converters in accordance with a second embodiment of the present invention. The step-up DC-DC power converter 100c may be viewed as an alternative variant of the step-up DC-DC converter topology 100b in accordance with the first embodiment of the invention where the electrical short-circuit connection or wire 109c extending across the isolation barrier 107c is connecting the second positive electrode of the output capacitor $C_{out}$ to the negative input terminal 102c of the primary side circuit. Thereby, a series coupling of the output capacitor $C_{out}$ and the input capacitor $C_{in}$ from the converter output voltage $V_{out}$ at the positive input terminal 104c to the negative electrode 101c of the output capacitor $C_{out}$ is established. The negative electrode 101c of the output capacitor $C_{out}$ is at a lower electric potential than the negative input terminal 102c. In this manner, the input voltage $V_{in}$ is stacked on top of the voltage across the first and second electrodes of the output capacitor $C_{out}$. Otherwise, circuit functions, electrical component characteristics and component values of the second embodiment of the step-up DC-DC power converter 100c may be identical to those discussed above in connection with the first embodiment of the step-up DC-DC power converter 100b.

Figure 1D:
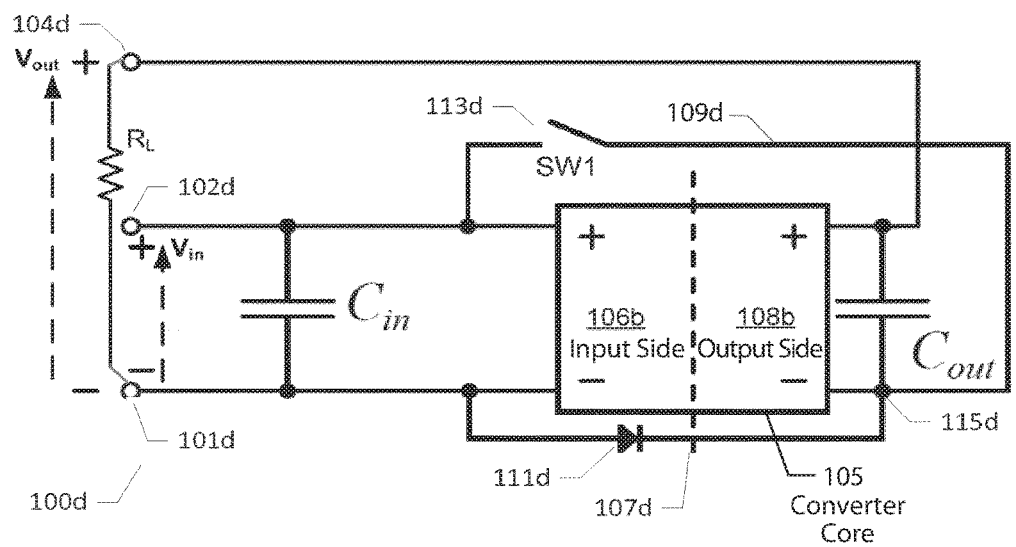

FIG. 1D) shows a step-up DC-DC power converter 100d in accordance with third embodiment of the invention. The converter core 105 of the step-up DC-DC power converter 100d may be identical to the core 105 of the step-up DC-DC power converter 100b discussed above in connection with FIGS. 1A) and 1B). Hence, corresponding features of these different step-up DC-DC power converter embodiments 100b, 100d have been provided with corresponding reference symbols to assist comparison. The third embodiment of the step-up DC-DC power converter 100d comprises a mode selecting controllable semiconductor switch SW1 inserted in a short-circuit connection or wire 109d. This short-circuit connection 109d effectively places the output capacitor $C_{out}$ and input capacitor $C_{in}$ is series between the output voltage $V_{out}$ at output terminal 104d and the negative input terminal 101d as discussed above.

The mode selecting controllable semiconductor switch SW1 is configured to switch the step-up DC-DC power converter 100d between two distinct modes of operation as discussed below. The controllable semiconductor switch SW1 may comprise one or more BJT(s), FET(s) MOSFET (s) or IGBT(s) such as a Gallium Nitride (GaN) or Silicon Carbide (SiC) transistor. SW1 may be switched between conducting/ON state and non-conducting/OFF state by a suitable control voltage applied on a gate or base terminal of the switch SW1. A mode controlling circuit of, or associated with, the step-up DC-DC power converter 100d may supply this control voltage to SW1.

SW1 is configured to break/disconnect or close/connect the short-circuit connection 109d depending on a state of SW1. The short-circuit connection 109d is established in a conducting/ON state of SW1 and the short-circuit connection 109d is broken/disconnected in a non-conducting/OFF state of SW1. In the conducting state of SW1, the primary side circuit and the secondary side circuit of the converter core 105 are connected by the short-circuit connection 109d. The step-up DC-DC power converter 100d additionally comprises a diode 111d connected between the negative input terminal 101d and a negative electrode 115d of the output capacitor $C_{out}$. This diode 111d is reverse biased and hence non-conducting when SW1 is conducting/ON because the negative output electrode 115d is at a higher potential than the negative input terminal 101d. Consequently, when SW1 is ON or conducting the step-up DC-DC power converter 100d operates in a first distinct mode where the functionality of the power converter 100d is similar to the functionality of the previously discussed step-up DC-DC power converter 100b with the accompanying advantages.

A second distinct mode of the step-up DC-DC power converter 100d is reached or provided in the non-conducting/OFF state of SW1 where the short-circuit connection 109d is broken or opened. In this second distinct mode, the diode 111d will be forward biased and conducting such that the primary side circuit and the secondary side circuit are electrically connected both through galvanic isolation barrier 107d and through the diode 111d. Hence, the conducting diode 111d bypasses the galvanic isolation barrier 107d in the second mode of the step-up DC-DC power converter 100d. However, the overall functionality of the step-up DC-DC power converter 100d in the second mode of operation remains similar to the functionality of a corresponding ordinary (i.e. lacking the first mode of operation) step-up DC-DC power converter.

The mode switching feature of the present step-up DC-DC power converter 100d is accompanied with several advantages. The mode switching feature increases the dynamic voltage operating range of the power converter 100d. To illustrate these advantages consider an ordinary DC-DC power converter designed for a DC input voltage of 10 V and a DC output voltage range from 5-15 V. If this ordinary DC-DC power converter is converted or configured as the present step-up DC-DC power converter 100d, the DC output voltage range may be increased to 5-25 V by switching the re-configured power converter between the first and second modes of operation. This increase of DC output voltage range provided by the mode switching feature of the present step-up DC-DC power converter 100d is particular advantageous for resonant power converters which generally suffer from a restricted or narrow DC output voltage range compared to non-resonant DC-DC power converters. However, exploiting the mode switching feature of the present step-up DC-DC power converter 100d requires that the intended application does not require galvanic isolation between the primary and secondary side circuits due to the electrical path through the diode 111d.

Figure 1E:
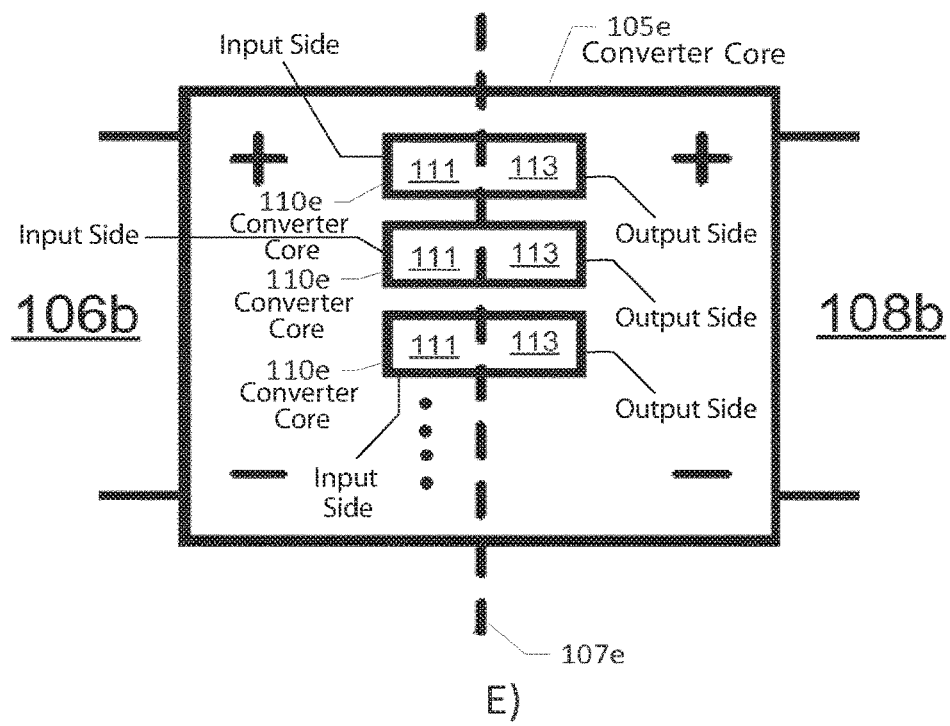
Figure 1E:
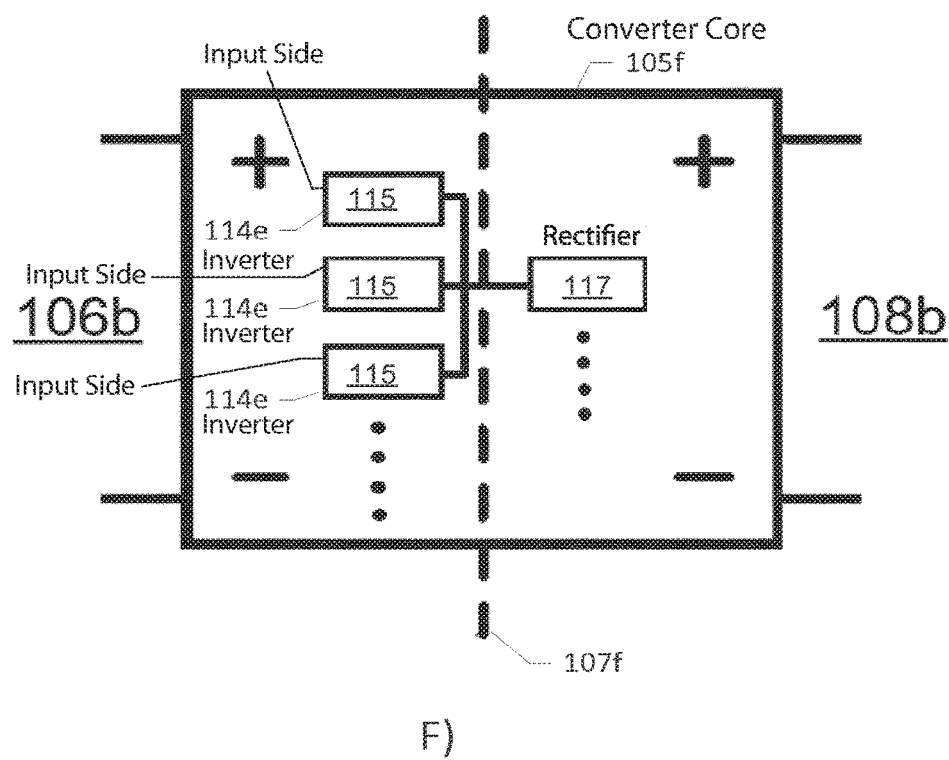

FIG. 1E) is simplified electrical circuit diagram of a first converter core 105e that may be utilized as converter core 105 in each of the step-up DC-DC power converter embodiments 100b, 100c, 100d, illustrated on FIGS. 1A), 1B), 1C) and 1D), respectively. The first converter core 105e comprises a plurality of separate resonant DC-DC power converter cores 110e. Each of the separate resonant DC-DC power converter cores 110e comprises an input side 111 of a switched energy storage network coupled to an output side 113 of the switched energy storage network through a galvanic isolation barrier 107e. The input sides 111 of the resonant DC-DC power converter cores 110e may be connected in parallel or series. The output sides 113 of the resonant DC-DC power converter cores 110e may likewise be connected in parallel or series. The parallelization of the plurality of input sides 111 and/or the parallelization of the one or more output sides 113 increases the power rating of a step-up DC-DC power converter utilizing the first converter core 105e. The skilled person will understand that each of the separate resonant DC-DC power converter cores 110e may comprise one of the prior art resonant DC-DC power converter cores discussed below with reference to FIGS. 2, 3, 4, and 5.

FIG. 1F) is simplified electrical circuit diagram of a second converter core 105f of each of the step-up DC-DC power converter embodiments 100b, 100c, 100d, illustrated on FIGS. 1A), 1B), 1C) and 1D), respectively. The second converter core 105f comprises a plurality of separate resonant power inverters 114e. Each of the separate resonant power inverter cores 114e comprises an input side 115 of a switched energy storage network coupled to one or more rectifier(s) 117 of the resonant DC-DC power converter core 105f through a galvanic isolation barrier 107f. The separate resonant power inverter cores 114e may be connected in parallel or series. Likewise, the respective output side of the one or more rectifier(s) 117 may also be connected in series or parallel. However, galvanic isolation may be inserted between the one or more rectifier(s) 117 if these are coupled in series.

FIG. 2A) shows an electrical circuit diagram of a prior art isolated class E resonant DC-DC converter 200 comprising a series resonant circuit including inductor $L_2$ and capacitor $C_1$. The prior art class E resonant converter comprises a primary side circuit and a secondary side circuit connected through a galvanic isolation barrier 207. The primary side circuit comprises a positive input terminal 202 and a negative input terminal 201 for receipt of a DC or AC input voltage $V_{in}$ from a voltage or power source (not shown). An input capacitor $C_{in}$ is electrically connected between the positive input terminal 202b and a negative input terminal 201 to form an energy reservoir for the voltage source. The primary side circuit additionally comprises a switched energy storage network which includes first and second series connected inductors $L_1$ and $L_2$ and a MOSFET switch S with a drain terminal connected to a midpoint node between the $L_1$ and $L_2$. The primary side circuit is arranged in front of an isolation barrier 207 formed by coupling capacitors $C_1$ and $C_2$. The secondary side circuit comprises an output capacitor $C_{out}$ having a first electrode electrically connected to the converter output voltage $V_{out}$ at output terminal 204. A second negative electrode of the output capacitor $C_{out}$ is coupled to a negative terminal 203 of the converter output voltage. A load of the isolated class E resonant DC-DC converter 200 is schematically illustrated by load resistor $R_L$ and coupled between the positive and negative output terminals 204, 203.

FIG. 2B) is an electrical circuit diagram of a class E resonant step-up DC-DC power converter 200b comprising a series resonant circuit in accordance with a sixth embodiment of the invention. The class E resonant step-up DC-DC power converter 200b may be obtained by conversion of the above-mentioned prior art isolated class E resonant DC-DC converter 200 by inserting or adding an electrical short circuit connection 209b extending across a galvanic isolation barrier 207b of the converter 200b in accordance with the principles discussed above in connection with the first embodiment of the invention discussed above in connection with FIGS. 1A) and 1B). The galvanic isolation barrier 207b comprises series capacitors $C_1$ and $C_2$. The electrical short circuit connection 209b connects the positive input terminal 202b and the second negative electrode 203b of the output capacitor $C_{out}$. As discussed in connection with FIGS. 1A) and 1B), the electrical short-circuit connection or wire 209b effectively places the output capacitor $C_{out}$ and input capacitor $C_{in}$ is series or cascade between the output voltage $V_{out}$ and the negative input terminal 201b. Hence, the electrical or power converter load, schematically illustrated by the load resistor $R_L$, is coupled between the converter output voltage at the output terminal 204b and the negative input terminal 201b. The skilled person will understand that the series capacitor $C_2$ of the galvanic isolation barrier 207b prevents DC current from flowing from the second negative electrode 203b of the output capacitor $C_{out}$ and back to the negative input terminal 201b electrode of the input voltage source. In this manner, the DC current is directed or forced through the electrical short circuit connection 209b and back through the input capacitor $C_{in}$. In this manner, despite being electrically by-passed by the conversion, the isolation barrier 207 is important for the operation of the present class E resonant step-up DC-DC power converter 200b as node 201b, 203b and 202b would be directly electrically connected causing a short circuit at the converter input.

The class E resonant step-up DC-DC power converter 200b may comprise a capacitor (not shown) arranged across drain and source terminals of the MOSFET switch S to increase a resonant current and/or adjust/fine-tune a resonance frequency of the power converter 200b. Likewise, a yet further capacitor (not shown) may be arranged across the rectifying diode D to adjust a duty cycle of the secondary part of the power converter 200b, i.e. the class E rectifier.

FIG. 3A) is an electrical circuit diagram of a prior art flyback DC-DC converter 300. The prior art DC-DC converter 300 comprises a primary side circuit and a secondary side circuit connected through a galvanic isolation barrier 307. The primary side circuit comprises a positive input terminal 302 and a negative input terminal 301 for receipt of a DC or AC input voltage $V_{in}$ from a voltage or power source (not shown). An input capacitor $C_{in}$ is electrically connected between the positive input terminal 302 and a negative input terminal 301 to form an energy reservoir for the input voltage source. The primary side circuit additionally comprises a switched energy storage network which comprises a first inductor $L_P$ having a first end coupled to the positive input terminal 302 and a second end to a drain terminal of a MOSFET switch S. A source terminal of the MOSFET switch S is coupled to the negative input terminal 301. The first inductor $L_P$ is a primary transformer winding of a transformer which provides a galvanic isolation barrier 307 of this prior art DC-DC converter 300. A secondary side circuit of the power converter 300 comprises an output capacitor $C_{out}$ having a first electrode electrically connected to the converter output voltage $V_{out}$ at output terminal 304. A second negative electrode of the output capacitor $C_{out}$ is coupled to a negative terminal 303 of the converter output voltage. An electrical or power converter load is schematically illustrated by load resistor $R_L$ and coupled between the positive and negative output terminals 304, 303 of the prior art DC-DC converter 300. The secondary side circuit furthermore comprises a second inductor $L_S$ which is a secondary transformer winding of the above-mentioned transformer. The secondary transformer winding $L_S$ has a first end coupled to a rectifying diode D and a second end coupled to the negative electrode of the output capacitor $C_{out}$. The rectifying diode D rectifies AC current generated by the secondary transformer winding $L_S$ and generates a DC voltage as the converter output voltage between the positive and negative output terminals 304, 303. An electrical or power converter load is schematically illustrated by load resistor $R_L$ coupled between the positive and negative output terminals 304, 303.

FIG. 3B) is an electrical circuit diagram of a flyback step-up DC-DC power converter 300b in accordance with a 7th embodiment of the invention. The flyback power converter 300b may be obtained by conversion of the above-mentioned prior art isolated flyback DC-DC converter 300 by inserting or adding an electrical short circuit connection 309b extending across a galvanic isolation barrier formed by the transformer comprising the magnetically coupled primary and secondary transformer windings $L_p$ and L. The electrical short circuit connection 309b connects the positive input terminal 302b and the second negative electrode 303b of the output capacitor $C_{out}$. As discussed in connection with FIGS. 1A) and 1B), the electrical short-circuit connection or wire 309b effectively places the output capacitor $C_{out}$ and input capacitor $C_{in}$ is series or cascade between the output voltage $V_{out}$ and the negative input terminal 301b. Hence, the electrical or power converter load, schematically illustrated by the load resistor $R_L$, is coupled between the converter output voltage at the output terminal 304b and the negative input terminal 301b. The skilled person will understand that the transformer coupling prevents DC current from flowing from the second negative electrode 303b of the output capacitor $C_{out}$ and back to the negative input terminal 301b electrode of the input voltage source. In this manner, the DC current is directed or forced through the electrical short circuit connection 309b and back through the input capacitor C.

FIG. 4A) is an electrical circuit diagram of a prior art isolated single-ended primary-inductor converter (SEPIC) 400. The prior art SEPIC 400 comprises a primary side circuit and a secondary side circuit connected through a galvanic isolation barrier 407. The primary side circuit comprises a positive input terminal 402 and a negative input terminal 401 for receipt of a DC or AC input voltage $V_{in}$ from a voltage or power source (not shown). An input capacitor $C_{in}$ is electrically connected between the positive input terminal 402 and a negative input terminal 401 to form an energy reservoir for the input voltage source. The primary side circuit additionally comprises a switched energy storage network which includes a first inductor $L_1$ having first node coupled to the DC or AC input voltage $V_{in}$ and a second node coupled to a drain terminal of a MOSFET switch S. A source terminal of the MOSFET switch S is coupled to the negative input terminal 401. The primary side circuit is arranged in front of an isolation barrier 407 formed by coupling capacitors $C_1$ and $C_2$. The secondary side circuit comprises an output capacitor $C_{out}$ having a first electrode electrically connected to the converter output voltage $V_{out}$ at output terminal 404. A second negative electrode of the output capacitor $C_{out}$ is coupled to a negative terminal 403 of the converter output voltage. A rectifying diode D rectifies AC current generated by a second inductor $L_2$ and generates a DC voltage as the converter output voltage $V_{out}$ between the positive and negative output terminals 404, 403. A load of the SEPIC 400b, illustrated by load resistor $R_L$ is coupled between the positive and negative output terminals 404, 403.

FIG. 4B) is an electrical circuit diagram of a SEPIC 400b in accordance with an 8th embodiment of the invention. The SEPIC 400b may be obtained by conversion of the above-mentioned prior art SEPIC 400 by inserting or adding an electrical short circuit connection 409b extending across a galvanic isolation barrier 407b of the SEPIC 400b. The galvanic isolation barrier 407b comprises series capacitors $C_1$ and $C_2$. The electrical short circuit connection 409b connects the positive input terminal 402b and the second negative electrode 403b of the output capacitor $C_{out}$. As discussed in connection with FIGS. 1A) and 1B), the electrical short-circuit connection or wire 409b effectively places the output capacitor $C_{out}$ and input capacitor $C_{in}$ is series or cascade between the output voltage $V_{out}$ and the negative input terminal 401b. Hence, the electrical or power converter load, schematically illustrated by the load resistor $R_L$, is coupled between the converter output voltage at the output terminal 404b and the negative input terminal 401b. The skilled person will understand that the series capacitor $C_2$ of the galvanic isolation barrier 407b prevents DC current from flowing from the second negative electrode 403b of the output capacitor $C_{out}$ and back to the negative input terminal 401*b* electrode of the input voltage source as discussed previously.

The SEPIC 400*b* may comprise a capacitor (not shown) connected or arranged across drain and source terminals of the MOSFET switch S to increase a resonant current and/or adjust/fine-tune a resonance frequency of the SEPIC 400*b*. Likewise, a yet further capacitor (not shown) may be arranged across the rectifying diode D to adjust a duty cycle of the power converter 400*b*.

FIG. 5A) shows an electrical circuit diagram of a prior art isolated class DE resonant DC-DC converter 500 comprising a series resonant circuit including $L_0$ and $C_0$. The prior art class DE converter 500 comprises a primary side circuit and a secondary side circuit connected through a galvanic isolation barrier 507. The primary side circuit comprises a positive input terminal 502 and a negative input terminal 501 for receipt of a DC or AC input voltage $V_{in}$ from a voltage or power source (not shown). An input capacitor $C_{in}$ is electrically connected between the positive input terminal 502 and a negative input terminal 501 to form an energy reservoir for the input voltage source. The primary side circuit additionally comprises a switched energy storage network comprising a half-bridge circuit comprising cascaded MOSFET switches $S_1$ and $S_2$ arranged across the positive and negative input terminals 502, 501, respectively. An output 506 of the half-bridge circuit is coupled to a first inductor $L_0$ of the series resonant circuit and the latter is coupled in series with the capacitor $C_0$. This primary side circuit is arranged in front of the isolation barrier 507 formed by the coupling capacitor $C_0$ of the series resonant circuit and a second capacitor $C_B$ inserted between the negative input terminal 501 and a negative output voltage terminal 503 to provide DC isolation between these in this prior art class DE converter 500. The secondary side circuit comprises an output capacitor $C_{out}$ having a first electrode electrically connected to the converter output voltage $V_{out}$ at output terminal 504. A second negative electrode of the output capacitor $C_{out}$ is coupled to the negative terminal 503 of the converter output voltage. A pair of rectifying diodes $D_1$ and $D_2$ rectifies AC current generated by excitation of the series resonant circuit and generates a DC voltage as the converter output voltage $V_{out}$ between the positive and negative output terminals 504, 503. A load of the class DE converter 500, illustrated by load resistor $R_L$, is coupled between the positive and negative output terminals 504, 503.

FIG. 5B) is an electrical circuit diagram of a class DE resonant DC-DC converter 500*b* in accordance with a 9$^{th}$ embodiment of the invention. The class DE converter 500*b* may be obtained by conversion of the above-mentioned prior art isolated class DE resonant DC-DC converter 500 by inserting or adding an electrical short circuit connection 509*b* extending across a galvanic isolation barrier 507*b* of the class DE converter 500*b*. The galvanic isolation barrier 507*b* comprises series capacitors $C_1$ and $C_2$. The electrical short circuit connection 509*b* connects the positive input terminal 502*b* and a second negative electrode 503*b* of the output capacitor $C_{out}$. As discussed in connection with FIGS. 1A) and 1B), the electrical short-circuit connection or wire 509*b* effectively places the output capacitor $C_{out}$ and input capacitor $C_{in}$ is series or cascade between the output voltage $V_{out}$ and the negative input terminal 501*b*. Hence, the electrical or power converter load, schematically illustrated by the load resistor $R_L$, is coupled between the converter output voltage at the output terminal 504*b* and the negative input terminal 501*b*. The skilled person will understand that the series capacitor $C_2$ of the galvanic isolation barrier 507*b* prevents DC current from flowing from the second negative electrode 503*b* of the output capacitor $C_{out}$ and back to the negative input terminal 501*b* electrode of the input voltage source as discussed previously. The series capacitor $C_1$ serves two purposes both forming part of the isolation barrier 507*b* and forming part of the series resonant circuit also including inductor L.

The class DE converter 500*b* may comprise a pair of capacitors (not shown) connected or arranged across the drain and source terminals of each of the MOSFET switches $S_1$ and $S_2$ to increase a resonant current and/or adjust/fine-tune a resonance frequency of the DE converter 500*b*. Likewise, a yet further pair of capacitors (not shown) may be arranged across the rectifying diodes $D_1$ and $D_2$ to adjust a duty cycle of the secondary part of the power converter 500*b*, i.e. the class DE rectifier.

The invention claimed is:

1. A step-up DC-DC power converter comprising:
a primary side circuit and a secondary side circuit coupled through a galvanic isolation barrier,
the primary side circuit comprising a positive and a negative input terminal for receipt of an input voltage and an input capacitor coupled between the positive and negative input terminals,
the secondary side circuit comprising an output capacitor chargeable to a converter output voltage between a first positive electrode and a second negative electrode,
a switched energy storage network configured for alternatingly being charged from the input voltage and discharged to the output capacitor through the galvanic isolation barrier in accordance with a switch control signal to produce the converter output voltage,
an electrical short-circuit connection across the galvanic isolation barrier connecting, in a first case, the second negative electrode of the output capacitor to the positive input terminal of the primary side circuit or, in a second case, connecting the first positive electrode of the output capacitor to the negative input terminal of the primary side circuit thereby establishing in both the first and second cases a series coupling of the output capacitor and the input capacitor, and
a load connection, in the first case, between the first positive electrode of the output capacitor and the negative input terminal or, in the second case, between the second negative electrode of the output capacitor and the positive input terminal,
wherein said galvanic isolation barrier comprises a first capacitor coupled in series with the positive input terminal of the primary side circuit and the first positive electrode of the output capacitor; and a second capacitor coupled in series with the negative input terminal of the primary side circuit and the second negative electrode of the output capacitor.

2. The step-up DC-DC power converter according to claim 1, wherein the galvanic isolation barrier comprises:
a pair of magnetically coupled inductors comprising a first inductor electrically connected to the primary side circuit and a second inductor electrically connected to the secondary side circuit.

3. The step-up DC-DC power converter according to claim 2, wherein the first and second inductors are wound around a common magnetic permeable structure to form an isolation transformer.

4. The step-up DC-DC power converter according to claim 1, wherein the electrical short-circuit connection has a DC resistance of less than 1 kΩ, less than 100Ω, or less than 10 Ω.

5. The step-up DC-DC power converter according to claim 1, wherein the switched energy storage network comprises:
   first and second series connected inductors and connected in series with the positive input voltage terminal,
   a semiconductor switch having a first switch node connected between a mid-point node between the first and second series connected inductors, a second switch node connected to the negative input terminal of the primary side circuit and a control terminal connected to the switch control terminal,
   a third inductor having a first end connected to a second end of the second inductor through the first capacitor of the galvanic isolation barrier and a second end connected to the converter output voltage at the positive electrode of the output capacitor, and
   a rectifier connected between the first end of the third inductor and the negative electrode of the output capacitor.

6. The step-up DC-DC power converter according to claim 3, wherein the first and second inductors are integrated in the switched energy storage network;
   the first inductor being arranged with a first inductor end connected to the positive input voltage terminal and a second inductor end connected to a first node of a semiconductor switch,
   a second node of the semiconductor switch being connected to the negative input terminal of the primary side circuit; and
   the second inductor comprising a first inductor end connected to the first positive electrode of output capacitor and a second inductor end connected to the second negative electrode, respectively, of the output capacitor through a rectifier.

7. The step-up DC-DC power converter according to claim 1, wherein the switched energy storage network comprises at least one semiconductor switch, a MOSFET, an IGBT, a Gallium Nitride (GaN) MOSFET or a Silicon Carbide (SiC) MOSFET.

8. The step-up DC-DC power converter according to claim 1, wherein a frequency of the switch control signal of the switched energy storage network has a frequency at or above 10 MHz, or at or above 30 MHz.

9. The step-up DC-DC power converter according to claim 1, comprising a resonant DC-DC power converter.

10. The step-up DC-DC power converter according to claim 1, wherein each of the input capacitor and the output capacitor has a capacitance smaller than 100 nF.

11. The step-up DC-DC power converter according to claim 1, further comprising:
   a rectifying element, or a diode, coupled between the positive input terminal and second negative electrode of the output capacitor; and
   a mode selecting semiconductor switch configured to selectively break and close the electrical short-circuit connection such that:
      in a first mode of the step-up DC-DC power converter, establishing the series connection of the output capacitor and the input capacitor; and
      in a second mode of the step-up DC-DC power converter, break the series coupling of the output capacitor and the input capacitor.

12. A method of converting an isolated DC-DC power converter to a step-up DC-DC power converter with higher power conversion efficiency, said method comprising:
   providing a primary side circuit and a secondary side circuit of the isolated DC-DC power converter,
   coupling an input capacitor between a positive input terminal and a negative input terminal of the primary side circuit,
   coupling an output capacitor between a positive and a negative terminal of the secondary side circuit,
   providing electrical coupling of the primary side circuit and the secondary side circuit through a galvanic isolation barrier which comprises a first capacitor coupled in series with the positive input terminal of the primary side circuit and the first positive electrode of the output capacitor; and a second capacitor coupled in series with the negative input terminal of the primary side circuit and the second negative electrode of the output capacitor,
   providing a switched energy storage network configured for alternatingly being charged from an input voltage of the converter and discharged to the output capacitor through the galvanic isolation barrier in accordance with a switch control signal to produce a converter output voltage,
   connecting, in a first case, an electrical short-circuit across the galvanic isolation barrier from the negative output terminal of the secondary side circuit to the positive input terminal of the primary side circuit or connecting, in a second case, the positive output terminal of the secondary side circuit to the negative input terminal of the primary side circuit thereby establishing in both the first case and the second case a series coupling of the output capacitor and the input capacitor, and
   coupling, in a first case, a power converter load between the positive terminal of the secondary side circuit and the negative input terminal or coupling, in the second case, the power converter load between the negative terminal of the secondary side circuit and the positive input terminal of the primary side circuit.

13. The method of converting an isolated DC-DC power converter to a step-up DC-DC power converter according to claim 12, wherein the isolated DC-DC power converter comprises a resonant DC-DC power converter.

14. The method of converting an isolated DC-DC power converter to a step-up DC-DC power converter according to claim 12, further comprising:
   connecting a rectifying element, between the positive input terminal and second negative electrode of the output capacitor; and
   inserting a mode selecting semiconductor switch into the electrical short-circuit connection for selectively breaking and closing the short circuit connection such that:
      establishing the series connection of the output capacitor and the input capacitor in a first mode of the step-up DC-DC power converter; and
      breaking or disconnecting the series coupling of the output capacitor and the input capacitor in a second mode of the step-up DC-DC power converter.

* * * * *